(12) United States Patent
Okuyoshi et al.

(10) Patent No.: US 11,005,114 B2
(45) Date of Patent: May 11, 2021

(54) PLANT CONTROL SYSTEM, PLANT CONTROL METHOD, AND NON-TRANSITORY COMPUTER-READABLE MEDIUM

(71) Applicant: TOYOTA JIDOSHA KABUSHIKI KAISHA, Toyota (JP)

(72) Inventors: Masahiro Okuyoshi, Okazaki (JP); Tetsuya Bono, Miyoshi (JP); Toshihiro Egawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 16/286,018

(22) Filed: Feb. 26, 2019

(65) Prior Publication Data

US 2019/0267642 A1    Aug. 29, 2019

(30) Foreign Application Priority Data

Feb. 28, 2018    (JP) .............................. JP2018-034129

(51) Int. Cl.
| | |
|---|---|
| *H01M 8/0438* | (2016.01) |
| *H01M 8/04537* | (2016.01) |
| *G06F 17/13* | (2006.01) |
| *G05B 17/00* | (2006.01) |
| *G05B 17/02* | (2006.01) |

(52) U.S. Cl.
CPC .......... *H01M 8/0438* (2013.01); *G05B 17/00* (2013.01); *G05B 17/02* (2013.01); *G06F 17/13* (2013.01); *H01M 8/04589* (2013.01)

(58) Field of Classification Search
CPC ......... G05B 17/00; G05B 17/02; G06F 17/13; H01M 8/0438; H01M 8/04589; Y02E 60/50
See application file for complete search history.

(56) References Cited

FOREIGN PATENT DOCUMENTS

JP    2015-201407 A    11/2015

OTHER PUBLICATIONS

P.L.Lee, G.R.Sullivan, "GenericModelControl(GMC)", Computers and Chemical Engineering, 12(6), 573-580, 1988.

*Primary Examiner* — Lingwen R Zeng
(74) *Attorney, Agent, or Firm* — Hunton Andrews Kurth LLP

(57) ABSTRACT

A plant control system is equipped with a plant, an actuator that controls a state of the plant based on a command value, and an arithmetic device that calculates the command value through the use of state information indicating the state of the plant and that outputs the command value to the actuator. The arithmetic device adopts, as the command value, a value of u obtained by deleting a time differential of y from equations: $dy/dt = f(y, u, d, t)$ and $K_4 \times dy/dt = K_3 \times y_{ref} - K_1 \times y + K_2 \times (\text{time integral of } (y_{ref} - y)) + K_5$.

10 Claims, 12 Drawing Sheets

PLANT CONTROL SYSTEM, PLANT CONTROL METHOD, AND NON-TRANSITORY COMPUTER-READABLE MEDIUM

INCORPORATION BY REFERENCE

The disclosure of Japanese Patent Application No. 2018-034129 filed on Feb. 28, 2018 including the specification, drawings and abstract is incorporated herein by reference in its entirety.

BACKGROUND

1. Technical Field

The disclosure relates to a plant control system, a plant control method, and a non-transitory computer-readable medium.

2. Description of Related Art

In P. L. Lee, G R. Sullivan, "Generic Model Control (GMC)", Computer and Chemical Engineering, 12(6), 573-580, 1988, there is disclosed an art concerning general model control applicable to the control of a plant or the like. In this art, an equation (92) shown below is defined when a relationship between an input vector u (a command value to an actuator) of the plant or the like and an output vector y of the plant or the like is expressed by an equation (91) shown below.

$$\dot{y}=f(y,u,d,t) \tag{91}$$

It should be noted herein that y is an output vector, that u is an input vector, that d is a disturbance vector, that t is a time, and $\dot{y}$ is a time differential of y.

$$\dot{y}=K_1(y_{ref}-y)+K_2\int_0^t(y_{ref}-y)dt \tag{92}$$

It should be noted herein that $K_1$ and $K_2$ are diagonal matrices and are design factors determined at the time at which a control is designed. Besides, $y_{ref}$ is a target value of y.

Then, an equation solved for the input vector u after deleting $\dot{y}$ by substituting the equation (92) to the equation (91) is regarded as a control rule. After that, the plant or the like is controlled through the use of the input vector u calculated according to the control rule.

SUMMARY

However, when the control is performed through the use of the aforementioned control rule in P. L. Lee, G R. Sullivan, "Generic Model Control (GMC)", Computer and Chemical Engineering, 12(6), 573-580, 1988, the response of y to $y_{ref}$ may overshoot because the coefficients $K_1$ and $K_2$ of $y_{ref}$ and y assume a common value. Furthermore, when the control for preventing this overshoot is performed, the responsiveness of the control may become too high. FIG. 12 is a view for illustrating a problem in P. L. Lee, G R. Sullivan, "Generic Model Control (GMC)", Computer and Chemical Engineering, 12(6), 573-580, 1988. It is demonstrated herein that overshoot is caused when ε=0.5 in the case where a target value x/x*=1.0, and that the responsiveness of the control is too high when ε=10 in the case where the target value x/x*=1.0. It is therefore safe to conclude that the degree of freedom in designing a response waveform is low in P. L. Lee, G R. Sullivan, "Generic Model Control (GMC)", Computer and Chemical Engineering, 12(6), 573-580, 1988.

It should be noted herein that, as described above, the response of the aforementioned y overshoots because the coefficients $K_1$ and $K_2$ of $y_{ref}$ and y assume a common value. This will be concretely explained. First of all, the n-th component in the vector in the aforementioned equation (92) is expressed by an equation (93) shown below.

$$\dot{y}_n=k_{1n}(y_{refn}-y_n)+k_{2n}\int_0^t(y_{refn}-y_n)dt \tag{93}$$

Then, when it is assumed that $k_{3n}$ is a coefficient of $y_{refn}$ as another variable, and further, that $k_{1n}=\alpha+\beta$ and $k_{2n}=\alpha\beta$ ($\alpha$ and $\beta$ are real numbers and $\alpha \geq \beta$), an equation (94) shown below is established.

$$\dot{y}_n=k_{3n}y_{refn}(\alpha+\beta)y_n+\alpha\beta\int_0^t(y_{refn}-y_n)dt \tag{94}$$

It should be noted herein that when the equation (94) is subjected to Laplace transformation and arranged, an equation (95) shown below is established.

$$Y_n(s) = \frac{k_{3n}s + \alpha\beta}{s^2 + (\alpha+\beta)s + \alpha\beta} Y_{refn}(s) \tag{95}$$

It should be noted herein that s is a complex number. Furthermore, a simple secondary delay is caused when $k_{3n}=0$.

Besides, a solution of a differential equation is expressed by an equation (96) shown below when a step input is added to $y_{refn}$ in the equation (95).

$$y_n = \frac{1}{\alpha-\beta}\{(k_{3n}-\beta)(1-e^{-\alpha t}) + (\alpha-k_{3n})(1-e^{-\beta t})\} \tag{96}$$

It should be noted herein that a solid line portion ($k_{3n}=k_{1n}$) in FIG. 13 shows changes with time in y in the case where $\alpha=4$ and $\beta=2$ in the equation (96). As described hitherto, overshoot is caused when the equation (92) is used.

The present disclosure provides a plant control system, a plant control method, and a non-transitory computer-readable medium for holding the rise in responsiveness at an appropriate level and enhancing the degree of freedom in designing response waveforms while preventing the occurrence of response overshoot.

A plant control system according to a first aspect of the present disclosure is equipped with a plant, an actuator that controls a state of the plant based on a command value, and an arithmetic device that calculates the command value through use of state information indicating the state of the plant, and that outputs the calculated command value to the actuator. The arithmetic device adopts, as the command value, a value of u obtained by deleting $\dot{y}$ from the following equations (A1) and (A2), $$\dot{y}=f(y,u,d,t) \tag{A1}$$

where y is the state information, u is the command value, d is a disturbance, t is a time, and $\dot{y}$ is a time differential of y, and $$K_4\dot{y}=K_3y_{ref}-K_1y+K_2\int_0^t(y_{ref}-y)dt+K_5 \tag{A2}$$

where $K_1$, $K_2$, $K_3$, $K_4$, and $K_5$ are diagonal matrices, $K_1$, $K_2$, and $K_4$ are not zero matrices, $K_1$ and $K_3$ are different from each other, and $y_{ref}$ is a target value of y.

As described hitherto, in the present aspect, the command value u is obtained through the use of the equation (A1) and the equation (A2) where the coefficients $K_1$ and $K_3$ are different from each other. Therefore, the rise in responsiveness can be held at an appropriate level, and the degree of freedom in designing response waveforms can be enhanced, while preventing the overshoot of the response of y.

Besides, the plant control system may be configured such that when $k_{1ii}$, $k_{2ii}$, and $k_{3ii}$ are non-zero (i, i) components of $K_1$, $K_2$, and $K_3$ respectively, $k3_{ii} \leq \alpha_i$ when $k_{1ii} = \alpha_i + \beta_i$, $k_{2ii} = \alpha_i \beta_i$, $\alpha_i$ and $\beta_i$ are positive real numbers, and $\alpha_i \geq \beta_i$. Thus, the plant control system may be applicable to any plant that is expressed by the equation (A1), regardless of whether the plant is linear or nonlinear. As a result, the application range of the plant control system is widened.

Furthermore, the $K_3$ may be a zero matrix, and the equation (A2) may be the following equation (A3), $$K_4 \dot{y} = -K_1 y + K_2 \int_0^t (y_{ref} - y) dt + K_5 \quad (A3)$$

Thus, the equation is made simpler than the equation (A2), and the load of the process of calculating the command value u is reduced.

Furthermore, the plant may be a fuel cell system that includes a fuel cell stack, a flow rate adjusting valve, and a discharging valve that discharges gas or drains water from the fuel cell stack, the actuator may be a current control device configured to control a state of the fuel cell system by a step-up converter, and the plant control system may be further equipped with a hydrogen pressure sensor that measures a hydrogen pressure value of the fuel cell stack and that outputs the hydrogen pressure value to the arithmetic device as the state information. In this case, the equation (A1) may be the following equation (A4), $$\frac{dP}{dt} = \frac{RT}{V}\left(Q_{inj} - \frac{N}{2F}I_u - Q_{hev} - Q_{crs}\right) \quad (A4)$$

where P is the hydrogen pressure value, R is a gas constant, T is a temperature of the fuel cell stack, V is a hydrogen volume, $Q_{inj}$ is a flow rate adjusted by the flow rate adjusting valve, N is a number of cells in the fuel cell stack, F is a Faraday constant, $I_u$ is a current limit value of the fuel cell stack as the command value that is output to the current control device, $Q_{hev}$ is a flow rate adjusted by the discharging valve, and $Q_{crs}$ is a crossover flow rate. The equation (A3) may be the following equation (A5), $$\frac{dP}{dt} = -\left(\frac{1}{T_1} + \frac{1}{T_2}\right)P + \frac{1}{T_1 T_2}\int_0^t (P_{ref} - P)dt + \dot{P}(0) + \left(\frac{1}{T_1} + \frac{1}{T_2}\right)P(0) \quad (A5)$$

where $P_{ref}$ is a target value of P and $T_1$ and $T_2$ are time constants of the response of P to $P_{ref}$. Thus, the rise in responsiveness can be held at an appropriate level while preventing the response of the pressure from overshooting, in performing the control of making the low-pressure hydrogen pressure close to the target value in the fuel cell.

Furthermore, each of $T_1$ and $T_2$ may be a value satisfying a first condition indicating that an amount of fall in P from $P_{ref}$ corresponding to the time constant is smaller than a first threshold, and a second condition indicating that an amount of change in a minimum current value in the fuel cell stack with respect to the time constant is equal to or smaller than a second threshold. The minimum current value may have been limited by $I_u$. Thus, the balance between the deterioration of the stack and the dynamic performance can be optimally controlled.

Besides, the plant control system may be further equipped with a sensor that acquires a state amount of the plant and that outputs the acquired state amount to the arithmetic device as the state information, and the arithmetic device may calculate the command value through use of the state information acquired from the sensor. Thus, since an actually acquired value of the state amount of the plant is used, a more appropriate command value can be calculated, and the state of the plant can be more accurately controlled.

Besides, each of $K_1$, the $K_2$, and the $K_4$ may be a row vector where remaining components other than a common component are equal to 0. This can make it easy to focus on the control for the response of at least one important index among a plurality of kinds of indices. For example, in the case where the plant is an inverted pendulum, the command value can be efficiently calculated by narrowing down the state information to the angle.

A plant control method according to a second aspect of the present disclosure includes accepting inputting of state information indicating a state of a plant in an arithmetic device (3), calculating, as a command value, a value of u obtained by deleting ẏ from the following equations (A6) and (A7) through use of the state information, in the arithmetic device (3), $$\dot{y} = f(y, u, d, t) \quad (A6)$$

where y is the state information, u is the command value, d is a disturbance, t is a time, and ẏ is a time differential of y, and $$K_4 \dot{y} = K_3 y_{ref} - K_1 y \pm K_2 \int_0^t (y_{ref} - y) dt + K_5 \quad (A7)$$

where $K_1$, $K_2$, $K_3$, $K_4$, and $K_5$ are diagonal matrices, $K_1$, $K_2$, and $K_4$ are not zero matrices, $K_1$ and $K_3$ are different from each other, and $y_{ref}$ is a target value of y, and outputting the calculated command value to an actuator, in the arithmetic device, and controlling the state of the plant based on the command value, in the actuator.

Besides, a non-transitory computer-readable medium according to a third aspect of the present disclosure stores a program for causing a computer to perform a process. The process includes processing of accepting inputting of state information indicating a state of a plant, processing of calculating, as a command value, a value of u obtained by deleting ẏ from the following equations (A8) and (A9), $$\dot{y} = f(y, u, d, t) \quad (A8)$$

where y is the state information, u is the command value, d is a disturbance, t is a time, and ẏ is a time differential of y, and $$K_4 \dot{y} = K_3 y_{ref} - K_1 Y + K_2 \int_0^t (y_{ref} - y) dt + K_5 \quad (A 9)$$

where $K_1$, $K_2$, $K_3$, $K_4$, and $K_5$ are diagonal matrices, $K_1$, $K_2$, and $K_4$ are not zero matrices, $K_1$ and $K_3$ are different from each other, and $y_{ref}$ is a target value of y, and processing of outputting the calculated command value to an actuator that controls the state of the plant based on the command value. An effect similar to that of the first aspect can be expected from these second and third aspects as well.

The present disclosure makes it possible to provide a plant control system, a plant control method, and a computer-readable medium for holding the rise in responsiveness at an appropriate level and enhancing the degree of freedom in designing response waveforms while preventing the occurrence of response overshoot.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The concrete embodiments to which the present disclosure including the above-mentioned respective aspects is applied will be described hereinafter in detail with reference to the drawings. Like elements are denoted by like reference symbols in the respective drawings, and redundant description thereof will be omitted as necessary for the sake of clear explanation.

First Embodiment

Figure 1:
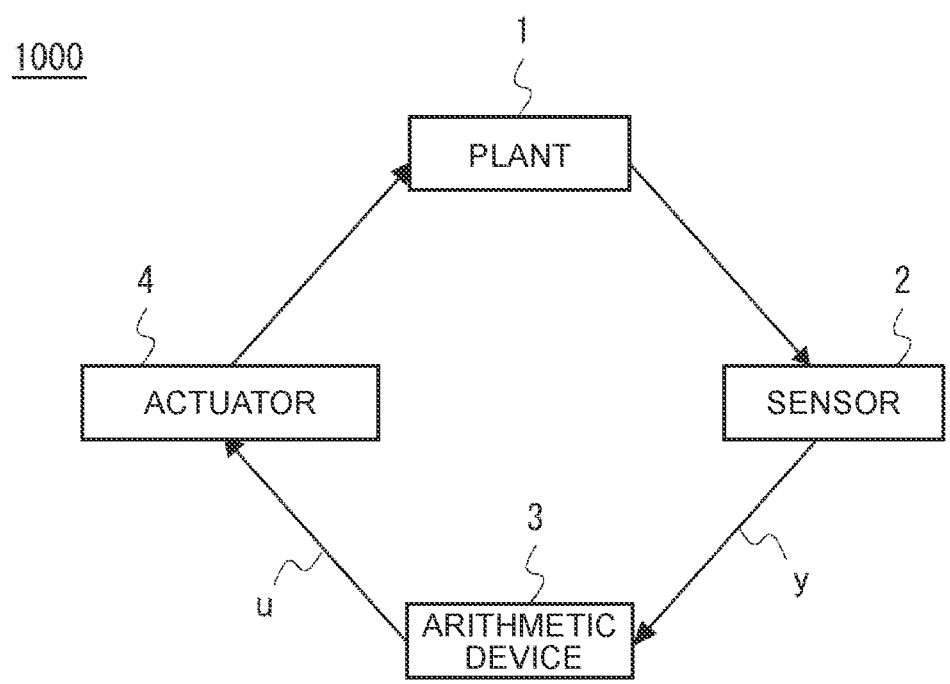
FIG. 1 is a block diagram showing the configuration of a plant control system according to the first embodiment.

FIG. 1 is a block diagram showing the configuration of a plant control system 1000 according to the first embodiment. The plant control system 1000 is equipped with a plant 1, a sensor 2, an arithmetic device 3, and an actuator 4. The plant 1 is a system that produces a predetermined physical quantity from a predetermined raw material. The plant 1 encompasses, for example, a fuel cell system, an internal combustion engine that is employed as a motive power device of an automobile, a motor, an inverted pendulum, and the like, but is not limited thereto. The actuator 4 controls the plant 1.

The sensor 2 measures a state amount of the plant 1, and outputs a result of this measurement to the arithmetic device 3 as state information y. It should be noted herein that either the single sensor 2 or a plurality of sensors 2 may be provided. Furthermore, the sensor 2 encompasses, for example, a low-pressure hydrogen pressure sensor or an airflow meter for measuring a flow rate of air and an instrument for measuring a pressure of air, and the like, but is not limited thereto. Incidentally, an estimator that estimates the physical quantity representing the state of the plant 1 may be employed instead of the sensor 2. Furthermore, the estimator outputs an estimated value of the physical quantity to the arithmetic device 3 as the state information y. It should be noted herein that the estimator may adopt, for example, a pressure at an inlet of a hydrogen pump as the estimated value of the physical quantity. The word "acquire" includes the word "measure" and "estimate" in the present specification.

The arithmetic device 3 calculates a command value u according to a method that will be described later, through the use of the state information y indicating the state of the plant 1, and outputs the calculated command value u to the actuator 4. For example, the arithmetic device 3 accepts the inputting of a measured value measured by the sensor 2 as the state information y, and calculates the command value u through the use of the measured value. Alternatively, the arithmetic device 3 accepts the inputting of an estimated value of a physical quantity estimated by the estimator as the state information y, and calculates the command value u through the use of the estimated value of the physical quantity.

The actuator 4 generates a control signal for controlling the production in the plant 1, based on the command value u from the arithmetic device 3, and outputs the control signal to the plant 1. It should be noted herein that either the single actuator 4 or a plurality of actuators 4 may be provided. Furthermore, for example, an FC (fuel cell) current control device or an air compressor and an air pressure adjusting valve and the like can be mentioned as the actuator 4, but the actuator 4 is not limited thereto.

It should be noted herein that the arithmetic device 3 calculates, as the command value u, a value of u obtained by deleting y from an equation (11) shown below and an equation (12) shown below, through the use of the state information y.

$$\dot{y}=f(y,u,d,t) \tag{11}$$

It should be noted herein that y is the state information, that u is the command value, that d is a disturbance, that t is a time, and that $\dot{y}$ is a time differential of y.

$$K_4\dot{y}=K_3 y_{ref}-K_1 y+K_2\int_0^t (y_{ref}-y)dt+K_5 \tag{12}$$

It should be noted herein that $K_1$, $K_2$, $K_3$, $K_4$, and $K_5$ are diagonal matrices, that $K_1$, $K_2$, and $K_4$ are not zero matrices, that $K_1$ and $K_3$ are different from each other, and that $y_{ref}$ is a target value of y.

Incidentally, the arithmetic device 3 is only required to be able to calculate at least the command value u based on the equation (11) and the equation (12). Therefore, for example, "an equation solved as to u" may be calculated offline in advance from the equation (11) and the equation (12). In this case, "the equation solved as to u" is calculated by deleting y by assigning the equation (12) to the equation (11) through the use of an arbitrary information processing device. Then, "the equation solved as to u" is mounted onboard, namely, on the arithmetic device 3, and the command value u is calculated.

Alternatively, "an equation at a stage prior to obtaining the solution as to u" may be calculated offline in advance from the equation (11) and the equation (12). In this case, an equation obtained by assigning the equation (12) to the equation (11), namely, an equation at a stage where the solution has not been obtained as to u although ẏ has been deleted is calculated through the use of the arbitrary information processing device. Then, "the equation at the stage prior to obtaining the solution as to u" is mounted onboard, namely, on the arithmetic device 3, and the command value u is calculated.

Besides, an equation (13) shown below may be used instead of the equation (12), by setting $K_3$ as a zero matrix in the equation (12).

$$K_4 \dot{y} = -K_1 y + K_2 \int_0^t (y_{ref} - y) dt + K_5 \tag{13}$$

Figure 2:
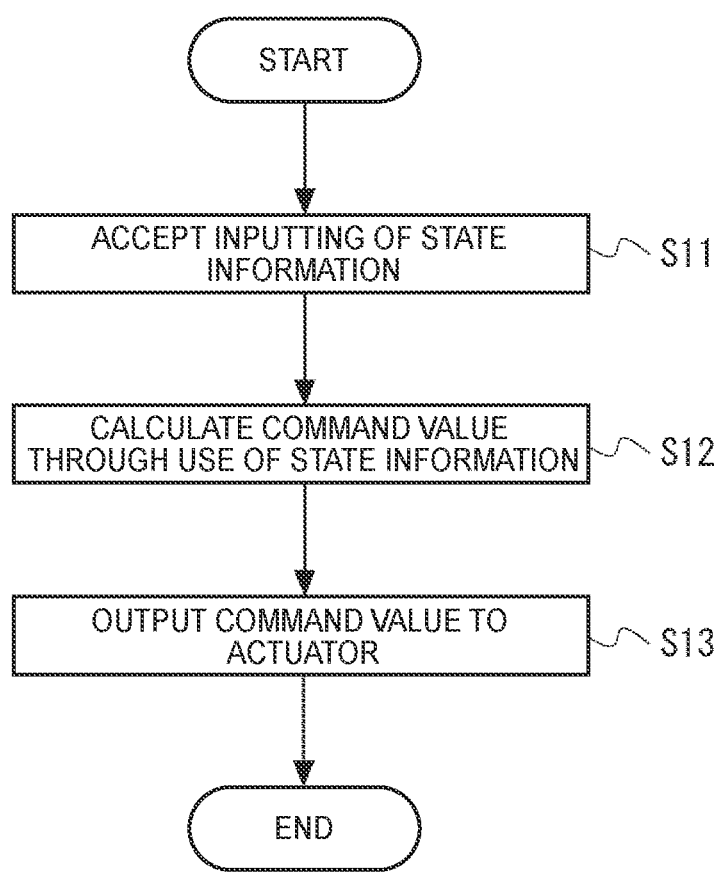
FIG. 2 is a flowchart for illustrating the flow of a plant control method according to the first embodiment.

FIG. 2 is a flowchart for illustrating the flow of a plant control method according to the first embodiment. First of all, the arithmetic device 3 accepts the inputting of state information (S11). Subsequently, the arithmetic device 3 calculates a command value through the use of the state information (S12). For example, the arithmetic device 3 calculates the command value according to "the equation solved as to u" or "the equation at the stage prior to obtaining the solution as to u", which are based on the equation (11) and the equation (12) or the equation (11) and the equation (13). Then, the arithmetic device 3 outputs the calculated command value to the actuator 4 (S13). After that, the actuator 4 controls the state of the plant 1 based on the command value accepted from the arithmetic device 3.

Incidentally, the arithmetic device 3 may be a computer device that operates by being logically endowed with such a function through the execution of a program stored in a built-in memory or read therefrom by a built-in processor.

It should be noted herein that the n-th component in the vector in the equation (12) is expressed by an equation (14) shown below.

$$k_{4n} \dot{y}_n = k_{3n} y_{refn} - k_{1n} y_n + k_{2n} \int_0^t (y_{refn} - y_n) dt \tag{14}$$

Then, when the coefficient of $y_{refn}$ is set as another variable, namely, $k_{3n}$, $k_{1n}=\alpha+\beta$ and $k_{2n}=\alpha\beta$ ($\alpha$ and $\beta$ are positive real numbers and $\alpha \geq \beta$) are further established, subjected to Laplace transformation, and arranged, and a step input is further added to $y_{refn}$ to solve a differential equation, an equation (15) shown below is established.

$$y_n = \frac{1}{\alpha - \beta}\{(k_{3n} - \beta)(1 - e^{-\alpha t}) + (\alpha - k_{3n})(1 - e^{-\beta t})\} \tag{15}$$

It should be noted herein that the occurrence of overshoot can be prevented by selecting $k_{3n}$ such that $k_{3n} \leq \alpha$.

Incidentally, the foregoing can also be rephrased in the following manner. That is, in the case where $k_{1ii}$, $k_{2ii}$, and $k_{3ii}$ are non-zero (i, i) components of $K_1$, $K_2$, and $K_3$ respectively in the equation (12), the occurrence of overshoot can be prevented by selecting $k_{3ii}$ such that $k_{3ii} \leq \alpha_i$ when $k_{1ii}=\alpha_i \beta_i$, $k_{2ii}=\alpha_i \beta_i$, $\alpha_i$ and $\beta_i$ are positive real numbers, and $\alpha_i \geq \beta_i$.

Figure 13:
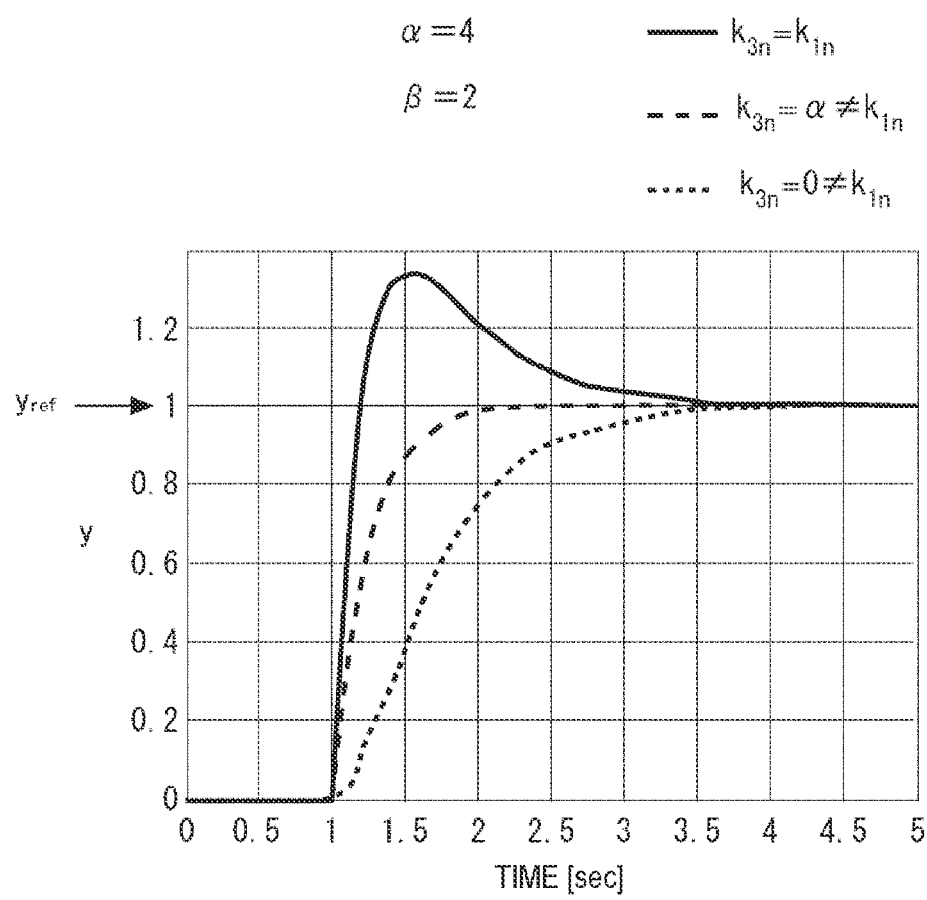
FIG. 13 is a view for illustrating the problem in the related art and an effect of the present disclosure.

It should be noted herein that FIG. 13 is a view for illustrating the problem in the related art and the effect of the present disclosure. FIG. 13 shows changes with time in y by a broken line ($k_{3n}=\alpha$) and a dotted line ($k_{3n}=0$) when $\alpha=4$ and $\beta=2$ in the equation (15) (and $k_{3n}$ is different from $k_{1n}$). It is thus demonstrated that there is no overshoot when $k_{3n} \leq \alpha$. In consequence, the present embodiment achieves an effect of ensuring a high degree of freedom in designing response waveforms. Incidentally, there are other control methods enabling the prevention itself of the occurrence of overshoot, but their application range is narrow. On the other hand, the control method according to the present embodiment is applicable to any plant that can be expressed by the equation (11), regardless of whether the plant is linear or non-linear, and hence guarantees a wide application range. Furthermore, four simple arithmetic operations and differential and integral calculus are sufficient to transform equations in calculating a control rule. Therefore, the utilization of the present embodiment is promoted due to its simplicity.

Second Embodiment

Figure 3:
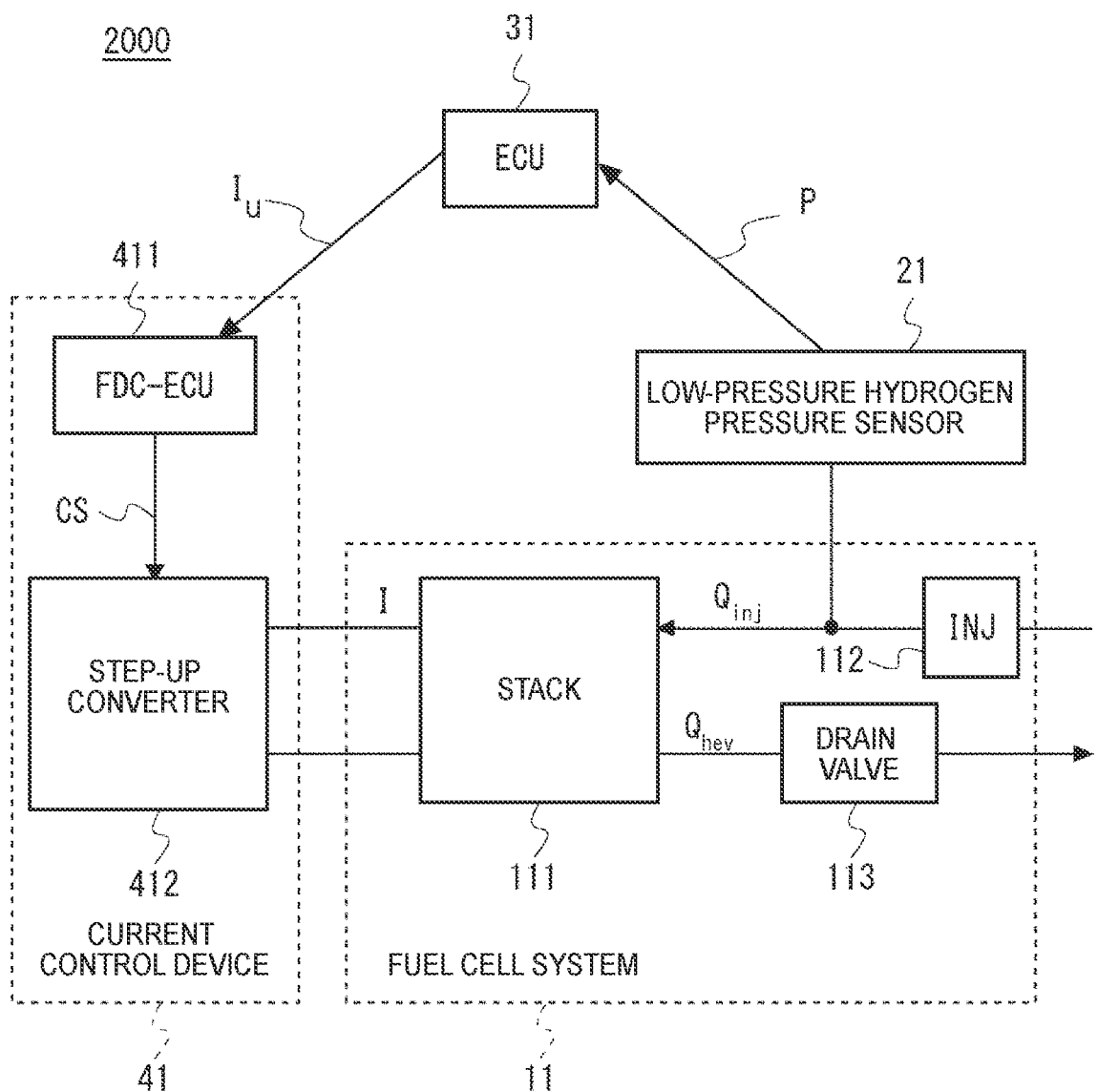
FIG. 3 is a block diagram showing the configuration of a fuel cell control system according to the second embodiment.

The second embodiment is a concrete example of the above-mentioned first embodiment. FIG. 3 is a block diagram showing the configuration of a fuel cell control system 2000 according to the second embodiment. The fuel cell control system 2000 is an example of the above-mentioned plant control system 1000, and is equipped with a fuel cell system 11, a low-pressure hydrogen pressure sensor 21, an electronic control unit (an ECU) 31, and a current control device 41. Incidentally, the fuel cell system 11 is an example of the above-mentioned plant 1, the low-pressure hydrogen pressure sensor 21 is an example of the above-mentioned sensor 2, the ECU 31 is an example of the above-mentioned arithmetic device 3, and the current control device 41 is an example of the above-mentioned actuator 4.

The fuel cell system 11 is an electric power generation system based on a polymer electrolyte fuel cell that generates electric power by being supplied with hydrogen and air. The fuel cell system 11 is equipped with at least a stack 111, an injector 112, and a drain valve 113. Incidentally, the fuel cell system 11 further includes the configuration of a general fuel cell system such as an oxygen system and the like, but the description and depiction thereof will be omitted. Besides, the injector 112 is an example of the flow rate adjusting valve. Furthermore, the drain valve 113 may be an exhaust valve. That is, the drain valve 113 is an example of the valve that discharges air or drains water, and adjusts a flow rate of the discharged anode-off gas.

The injector 112 is a flow rate adjusting valve for adjusting the flow rate of hydrogen supplied to the stack 111 from a hydrogen tank (not shown). The stack 111 is a fuel cell that generates electric power through an electrochemical reaction between the atmosphere containing the oxygen supplied from the oxygen system (not shown) and the hydrogen supplied via the injector 112. Besides, the stack 111 is configured as an assembly of a plurality of cells. The drain valve 113 is a valve for draining the water produced through the reaction in the stack 111.

The low-pressure hydrogen pressure sensor 21 measures a pressure value of the hydrogen supplied to the stack 111 via the injector 112, and outputs the measured pressure value to the ECU 31 as a low-pressure hydrogen pressure value P. The ECU 31 accepts the inputting of the low-pressure hydrogen pressure value P from the low-pressure hydrogen pressure sensor 21, calculates a current limit value $I_u$ through the use of the low-pressure hydrogen pressure value P, and outputs the current limit value $I_u$ to the current control device 41.

The current control device 41 includes at least an FDC-ECU 411 and a step-up converter 412. The current control device 41 controls the state of the fuel cell system 11 by the step-up converter 412. The FDC-ECU 411 is a control device that controls the step-up converter 412 based on the current limit value $I_u$ accepted from the ECU 31. In concrete terms, the FDC-ECU 411 generates a control signal CS for holding the current at the current limit value $I_u$, and outputs the control signal CS to the step-up converter 412. The step-up converter 412 enhances the voltage of the electric power that has been generated in and output from the stack 111 and whose current is equal to I to a predetermined voltage, holds the current I at the designated predetermined current limit value $I_u$, and outputs this current limit value $I_u$. That is, the step-up converter 412 accepts the control signal CS from the FDC-ECU 411, adjusts the current I in accordance with the control signal CS such that the current I becomes equal to the current limit value $I_u$, and outputs the current limit value $I_u$.

It should be noted herein that the ECU 31 according to the present embodiment calculates the current limit value $I_u$ through the use of the following equations. First of all, an equation (21) shown below is used as a concrete example of the equation (11).

$$\frac{dP}{dt} = \frac{RT}{V}\left(Q_{inj} - \frac{N}{2F}I_u - Q_{hev} - Q_{crs}\right) \quad (21)$$

It should be noted herein that P is a low-pressure hydrogen pressure value, that R is a gas constant, that T is a temperature of the fuel cell, that V is a low-pressure hydrogen volume, that $Q_{inj}$ is a flow rate adjusted by the injector 112, that N is the number of cells in the stack 111, that F is the Faraday constant, that $I_u$ is the current limit value of the fuel cell, that $Q_{hev}$ is a flow rate adjusted by the drain valve 113, that $Q_{crs}$ is a crossover flow rate, namely, a flow rate of penetration from the hydrogen side to the oxygen side.

Besides, an equation (22) shown below is used as a concrete example of the equation (13).

$$\frac{dP}{dt} = -\left(\frac{1}{T_1} + \frac{1}{T_2}\right)P + \frac{1}{T_1 T_2}\int_0^t (P_{ref} - P)dt + \dot{P}(0) + \left(\frac{1}{T_1} + \frac{1}{T_2}\right)P(0) \quad (22)$$

It should be noted herein that $P_{ref}$ is a target value of P and that $T_1$ and $T_2$ are time constants of the response of P to $P_{ref}$.

Then, "an equation solved as to the current limit value $I_u$" can be derived in the following manner. First of all, when the equation (21) and the equation (22) are transformed by deleting the time differential of the pressure P therefrom, an equation (23) shown below is established.

$$I = \frac{2F}{N}\frac{V}{RT}\left\{\left(\frac{1}{T_1} + \frac{1}{T_2}\right)P - \frac{1}{T_1 T_2}\int_0^t (P_{ref} - P)dt - \left(\frac{1}{T_1} + \frac{1}{T_2}\right)P(0)\right\} + \left\{-\frac{2F}{N}\frac{V}{RT}\dot{P}(0) + \frac{2F}{N}(Q_{inj} - Q_{hev} - Q_{crs})\right\} \quad (23)$$

Subsequently, when the integral term of the equation (23) is discretized, an equation (24) shown below is established. In consequence, the equation (24) can be regarded as "the equation solved as to the current limit value $I_u$", namely, the control rule.

$$I(n) = \quad (24)$$

$$\frac{2F}{N}\frac{V}{RT}\left\{\left(\frac{1}{T_1} + \frac{1}{T_2}\right)P - \frac{\Delta t}{T_1 T_2}\left\{\sum_{k=0}^{n}(P_{ref}(k) - P(k)) - (P_{ref0} - P_0)\right\} - \left(\frac{1}{T_1} + \frac{1}{T_2}\right)P(0)\right\} + \left\{-\frac{2F}{N}\frac{V}{RT}\dot{P}(0) + \frac{2F}{N}(Q_{inj} - Q_{hev} - Q_{crs})\right\}$$

Alternatively, an equation (25) shown below, which is obtained by substituting $I_{u0}$ for the term defined by the expression in the last pair of curly brackets on the right side of the equation (24) such that $I_u(0)$ becomes equal to $I_{u0}$ may be regarded as "the equation solved as to the current limit value $I_u$", namely, the control rule.

$$I_u(n) = \frac{2F}{N}\frac{V}{RT}\left[\left(\frac{1}{T_1} + \frac{1}{T_2}\right)P(n) - \frac{\Delta t}{T_1 T_2}\left\{\sum_{k=0}^{n}(P_{ref}(k) - P(k)) - (P_{ref0} - P_0)\right\} - \left(\frac{1}{T_1} + \frac{1}{T_2}\right)P(0)\right] + I_{u0} \quad (25)$$

It should be noted herein that $I_u$ is an (FC) current limit value, that $P_{ref}$ is a target value of P, and that $T_1$ and $T_2$ are time constants of the response of the pressure P (Pa) to the target pressure value $P_{ref}$ (Pa). Besides, $P_0$ is a low-pressure hydrogen pressure (Pa) at the time of the start of limitation of the current of the FC, $I_{u0}$ is an FC current (A) at the time of the start of limitation of the current of the FC, and $\Delta t$ is a control cycle (sec).

Figure 4:
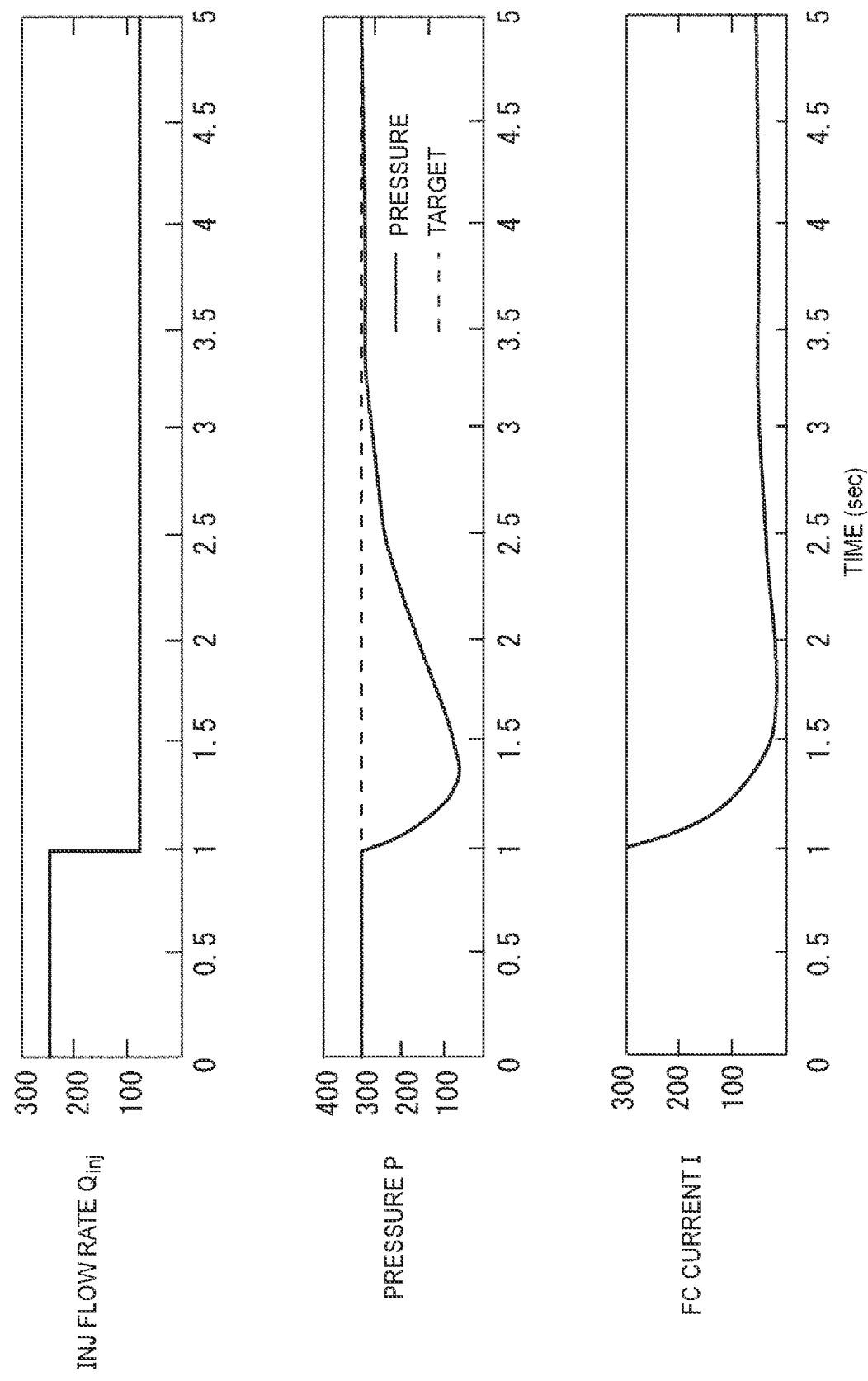
FIG. 4 is a view showing examples of changes with time in an injector flow rate, a hydrogen pressure value, and an FC current value according to the second embodiment.

FIG. 4 is a view showing examples of changes with time in the injector flow rate $Q_{inj}$, the hydrogen pressure value P, and the FC current value I according to the second embodiment. Incidentally, the numerical values on the scales of the axes of ordinate in upper and lower views of FIG. 4 are relative values with respect to the origin, and should not be limited to any concrete numerical values. First of all, from a timing 0 to a timing 1, the current I of the electric power generated by the fuel cell and the injector flow rate $Q_{inj}$ are balanced with each other. That is, the consumption and the supply are balanced with each other. In consequence, the hydrogen pressure value P is also constant. Subsequently, it is assumed that the injector flow rate $Q_{inj}$ decreases at the timing t=1 for some reason. In this case, the stack 111 continues to generate electric power while the supply amount of hydrogen remains insufficient. Therefore, the hydrogen pressure value P falls. Then, the low-pressure hydrogen pressure sensor 21 measures the hydrogen pressure value P that has fallen, and outputs the measured hydrogen pressure value P to the ECU 31. Then, the ECU 31 calculates the current limit value $I_u$ through the use of the hydrogen pressure value P that has fallen, and issues a command to the step-up converter 412 via the FDC-ECU 411. In consequence, the step-up converter 412 limits the current I of the electric power generated by the stack 111 to the current limit value $I_u$. Thus, the consumption amount of hydrogen in the stack 111 is held small, and the hydrogen pressure value P recovers. At this time, the hydrogen pressure value P smoothly converges toward the target value $P_{ref}$ and does not overshoot.

Subsequently, the conditions of optimal values of the time constants $T_1$ and $T_2$ will be described. First of all, when the equation (22) is subjected to Laplace transformation, an equation (26) shown below is established.

$$P = \frac{1}{(T_1 s + 1)(T_2 s + 1)} P_{ref} \quad (26)$$

Figure 5:
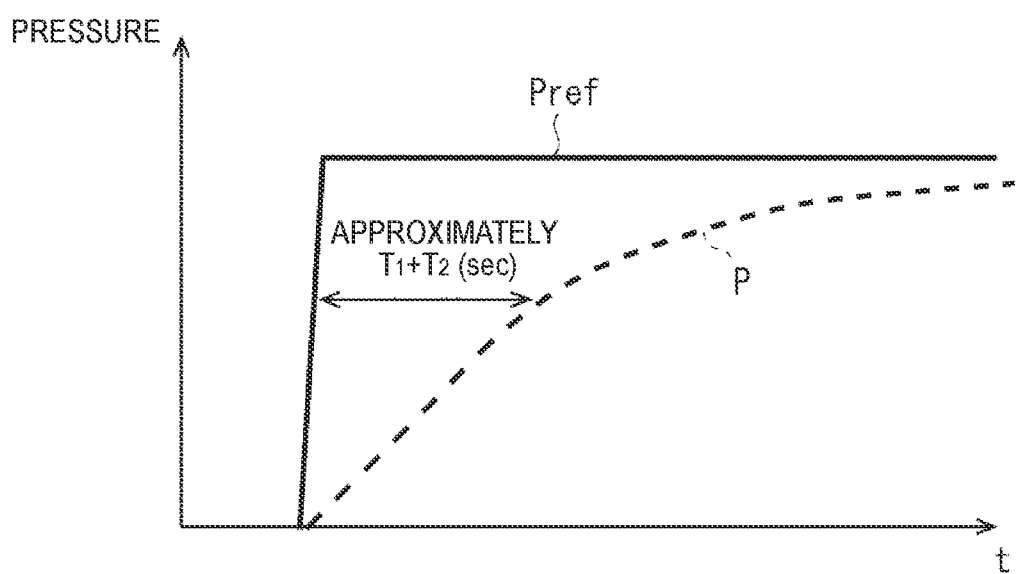
FIG. 5 is a view showing a relationship between a time constant and the hydrogen pressure value according to the second embodiment.

It should be noted herein that s is a complex number. FIG. 5 is a view showing a relationship between the time constant and the hydrogen pressure value according to the second embodiment.

Subsequently, an optimal value of T as $T=T_1=T_2$ will be studied. First of all, T is a follow-up time constant, so the follow-up progresses fast when T is small. Furthermore, the amount of limitation of the FC current is large when the follow-up progresses fast. Therefore, the limited FC current becomes small. Then, when the limited FC current becomes small, the width by which the pressure falls below a target lower limit becomes small, and the stack is unlikely to deteriorate due to the deficiency of hydrogen. At the same time, when the limited FC current becomes small, the operating performance level becomes low.

On the other hand, the follow-up progresses slowly when T is large. Furthermore, the amount of limitation of the FC current is small when the follow-up progresses slowly. Therefore, the limited FC current becomes large. Then, when the limited FC current becomes large, the width by which the pressure falls below the target lower limit becomes large, and the stack is likely to deteriorate. At the same time, when the limited FC current becomes large, the operating performance level becomes high.

A method of specifying the optimal time constant T through the following simulation in view of the aforementioned tendency will be described. For example, the fuel cell control system 2000 according to the present embodiment is mathematically modelled, a simulation of the control of the fuel cell is carried out as to models having various time constants, by the arbitrary information processing device, and combinations of a minimum current value of the electric power generated after limiting the current, a pressure value, and a time constant are saved into a storage device as a result of the control. Then, the information processing device specifies the time constants $T_1$ and $T_2$ in those of the saved combinations in which the minimum current value and the pressure value satisfy conditions that will be described later. Then, the ECU 31 can calculate the optimal current limit value $I_u$ by applying the specified time constants $T_1$ and $T_2$ to the equation (24) or the equation (25).

Figure 6:
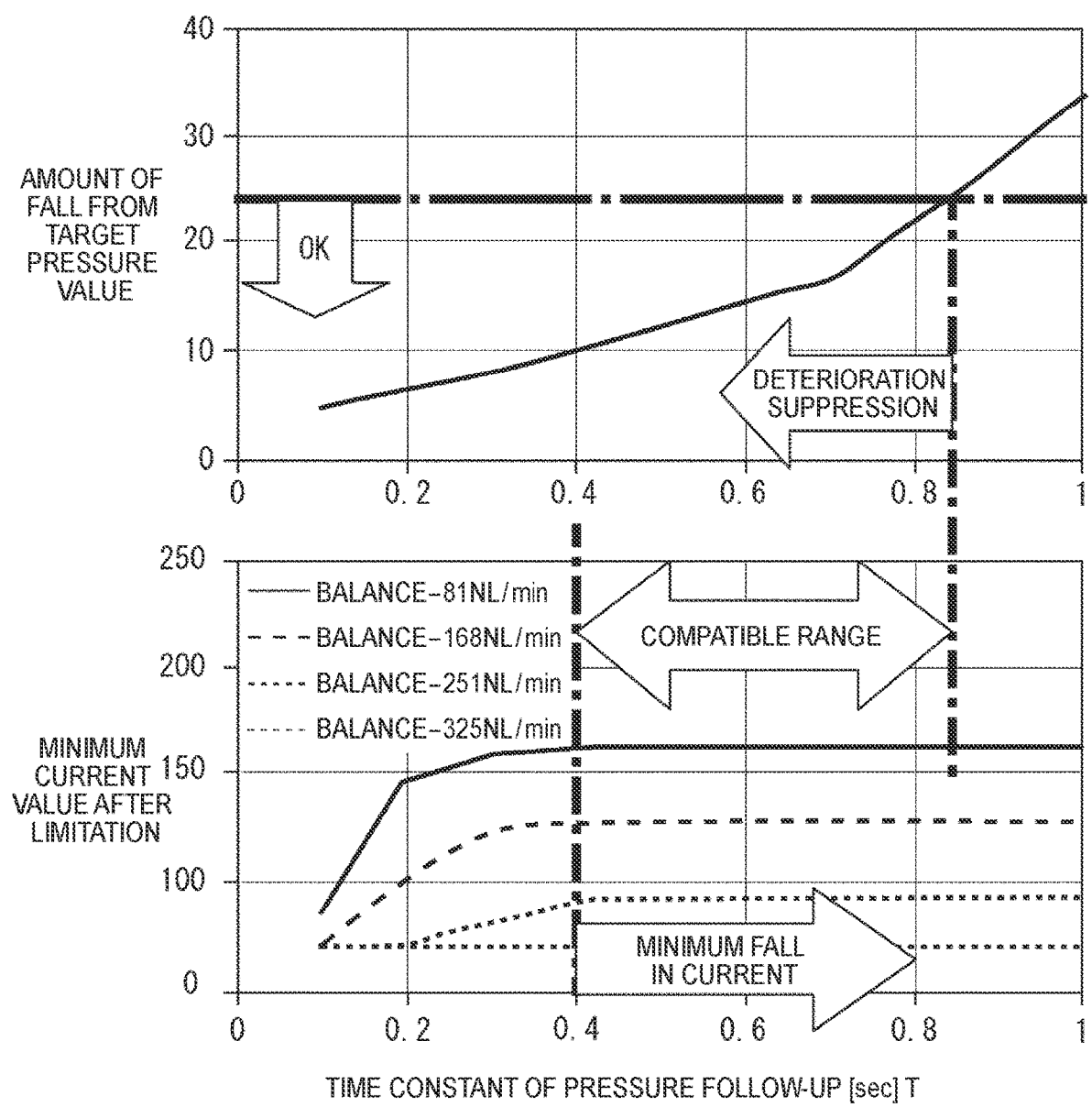
FIG. 6 is a view showing how the time constant is related to a pressure change amount and a minimum current value according to the second embodiment.

In more concrete terms, the information processing device carries out the aforementioned simulation as to various time constants, and calculates a difference between the pressure target value $P_{ref}$ at each of the time constants and the pressure value P as the control result thereof. The pressure value P is lower than the pressure target value $P_{ref}$ due to the above-mentioned follow-up performance, so the difference therebetween is an amount of fall in the pressure value P with respect to the pressure target value $P_{ref}$ at a certain time constant. The upper view of FIG. 6 shows a relationship between the time constant and the amount of fall in the pressure value P from the pressure target value $P_{ref}$ corresponding to the time constant. As described hitherto, as long as the time constant is equal to or smaller than a certain value (a first threshold), the follow-up performance can be maintained by holding the amount of fall within a permissible range. Therefore, each of $T_1$ and $T_2$ is desired to satisfy a first condition indicating that the amount of fall in P from $P_{ref}$ corresponding to the time constant is smaller than the first threshold.

Besides, the information processing device carries out the aforementioned simulation as to various time constants, limits the current in the step-up converter to the current limit value calculated at each of the time constants, and calculates the minimum current value of the electric power generated by the fuel cell after limitation. The lower view of FIG. 6 shows a relationship between the time constant and the minimum current value of the electric power generated after being limited to the current limit value corresponding to the time constant. Incidentally, the term "balance" in FIG. 6 is equivalent to a value of "the injector flow rate $Q_{inj}$—the exhaust drain valve flow rate $Q_{hev}$—the crossover flow rate $Q_{crs}$." As described hitherto, even when the time constant becomes large, the limited minimum current value does not continue to rise. Then, after the time constant has become equal to or larger than a predetermined value (0.4 in the lower view of FIG. 6), the limited minimum current value is substantially constant. That is, each of $T_1$ and $T_2$ is desired to satisfy a second condition indicating that the amount of change in the minimum current value in the fuel cell after being limited to the current limit value with respect to the time constant is equal to or smaller than a second threshold (i.e., there is no change). The second threshold is equal to, for example, 0. Besides, the second condition may indicate that each of $T_1$ and $T_2$ is a time constant upon or after the convergence of the minimum current value in the fuel cell after being limited to the current limit value to a third threshold.

In consequence, optimal control can be performed when each of $T_1$ and $T_2$ is a value satisfying the aforementioned first condition and the aforementioned second condition. Incidentally, the numerical values on the scales of the axes of ordinate in the upper and lower views of FIG. 6 are relative values with respect to the origin, and should not be limited to any concrete numerical values.

Third Embodiment

Figure 7:
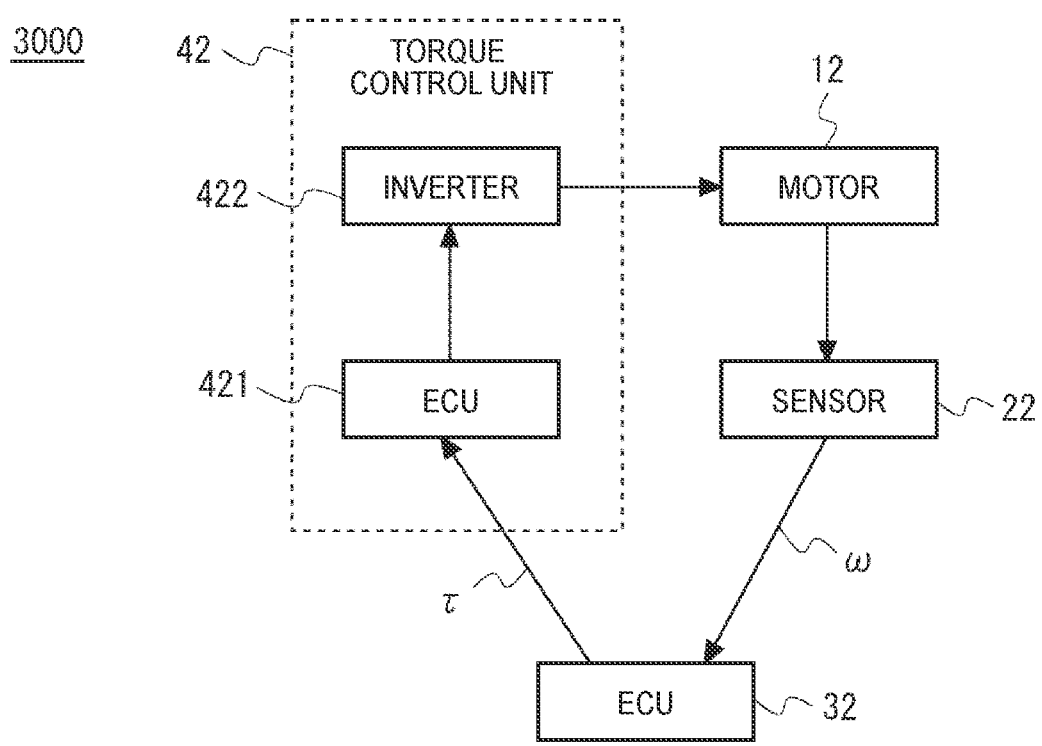
FIG. 7 is a block diagram showing the configuration of a torque control system according to the third embodiment.

The third embodiment is another concrete example of the above-mentioned first embodiment. FIG. 7 is a block diagram showing the configuration of a torque control system 3000 according to the third embodiment. The torque control system 3000 is an example of the above-mentioned plant control system 1000, and is equipped with a motor 12, a sensor 22, an ECU 32, and a torque control unit 42. For example, a motor of an air compressor can be mentioned as the motor 12, but the motor 12 is not limited thereto. The sensor 22 measures a rotational speed ω of the motor 12, and outputs the rotational speed ω to the ECU 32. The ECU 32 accepts the inputting of the rotational speed ω from the sensor 22, calculates an input torque τ in an inverter 422 through the use of the rotational speed ω, and outputs the input torque τ to the torque control unit 42. The torque control unit 42 is equipped with an ECU 421 and the inverter 422. The ECU 421 performs torque control by the inverter 422 through the use of the input torque τ accepted from the ECU 32. Incidentally, the motor 12 is an example of the above-mentioned plant 1, the sensor 22 is an example of the above-mentioned sensor 2, the ECU 32 is an example of the above-mentioned arithmetic device 3, and the torque control unit 42 is an example of the above-mentioned actuator 4.

It should be noted herein that the ECU 32 according to the present embodiment calculates the input torque τ such that the rotational speed ω of the motor 12 follows up the input torque τ, through the use of the following equations. First of all, an equation (31) shown below is used as a concrete example of the equation (11).

$$J\dot{\omega} + \alpha\omega + \tau L(\omega) = \tau \qquad (31)$$

It should be noted herein that J is an inertia moment, that ω is an angular velocity (the rotational speed of the motor 12), that τ is an input torque resulting from the inverter 422, and that $\tau_L$ is a load torque.

Besides, an equation (32) shown below is used as a concrete example of the equation (12).

$$\dot{\omega}=k_3\omega_{ref}-k_1\omega+k_2\int_0^t(\omega_{ref}-\omega)dt \tag{32}$$

It should be noted herein that $k_3$ and $k_1$ are different values, and that $\omega_{ref}$ is a target value of $\omega$.

Then, "an equation solved as to the input torque $\tau$" can be derived as follows. That is, when the equation (32) is assigned to the equation (31) and the time differential of the angular velocity $\omega$ is deleted to transform the equation, an equation (33) shown below is established. That is, the equation (33) can be regarded as the control rule.

$$\tau=Jk_3\omega_{ref}+(\alpha-Jk_1)\omega+Jk_2\int_0^t(\omega_{ref}-\omega)dt+\tau_L(\omega) \tag{33}$$

As described hitherto, in the present embodiment as well, the motor 12 can be expressed by the equation (31). Therefore, the rise in responsiveness can be held at an appropriate level, and the degree of freedom in designing response waveforms can be enhanced, while preventing the occurrence of response overshoot, through the use of the equation (33).

Fourth Embodiment

Figure 8:
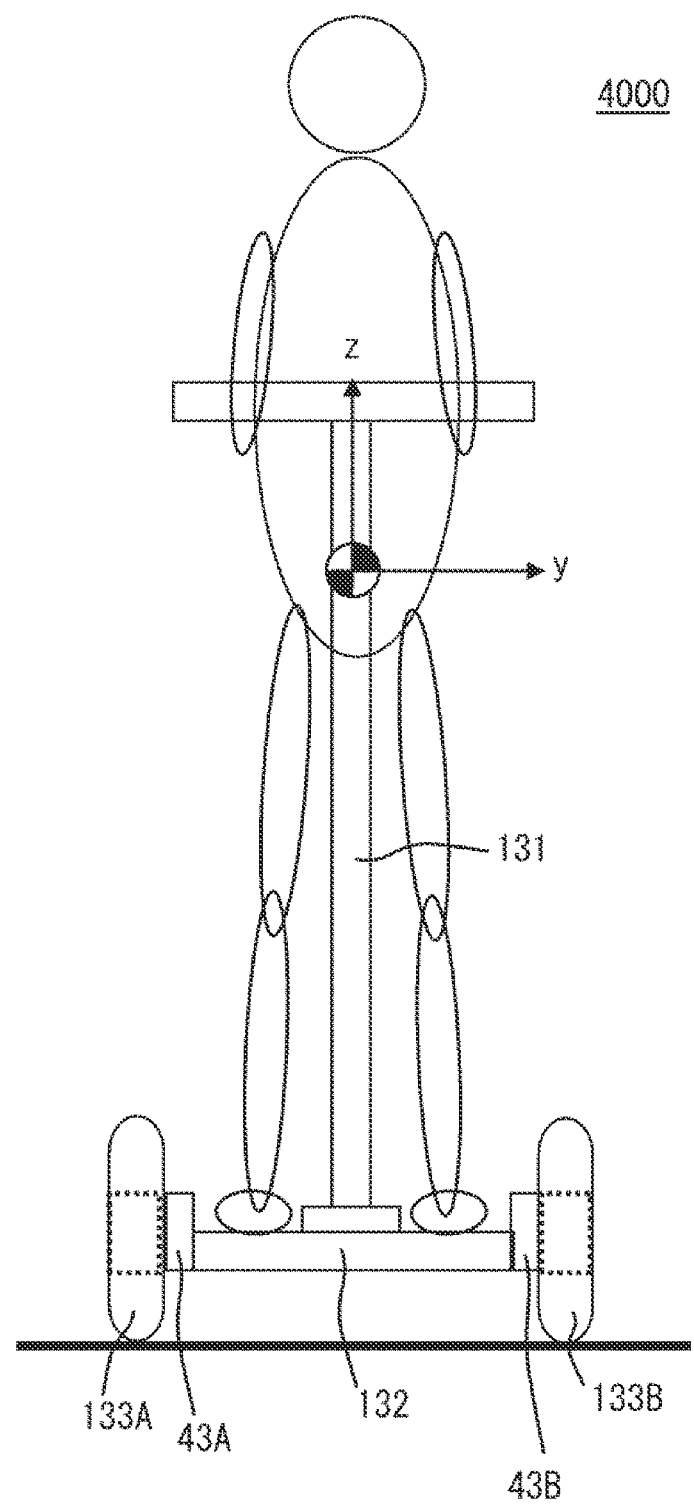
FIG. 8 is a front view showing the external configuration of an inverted pendulum according to the fourth embodiment.
Figure 9:
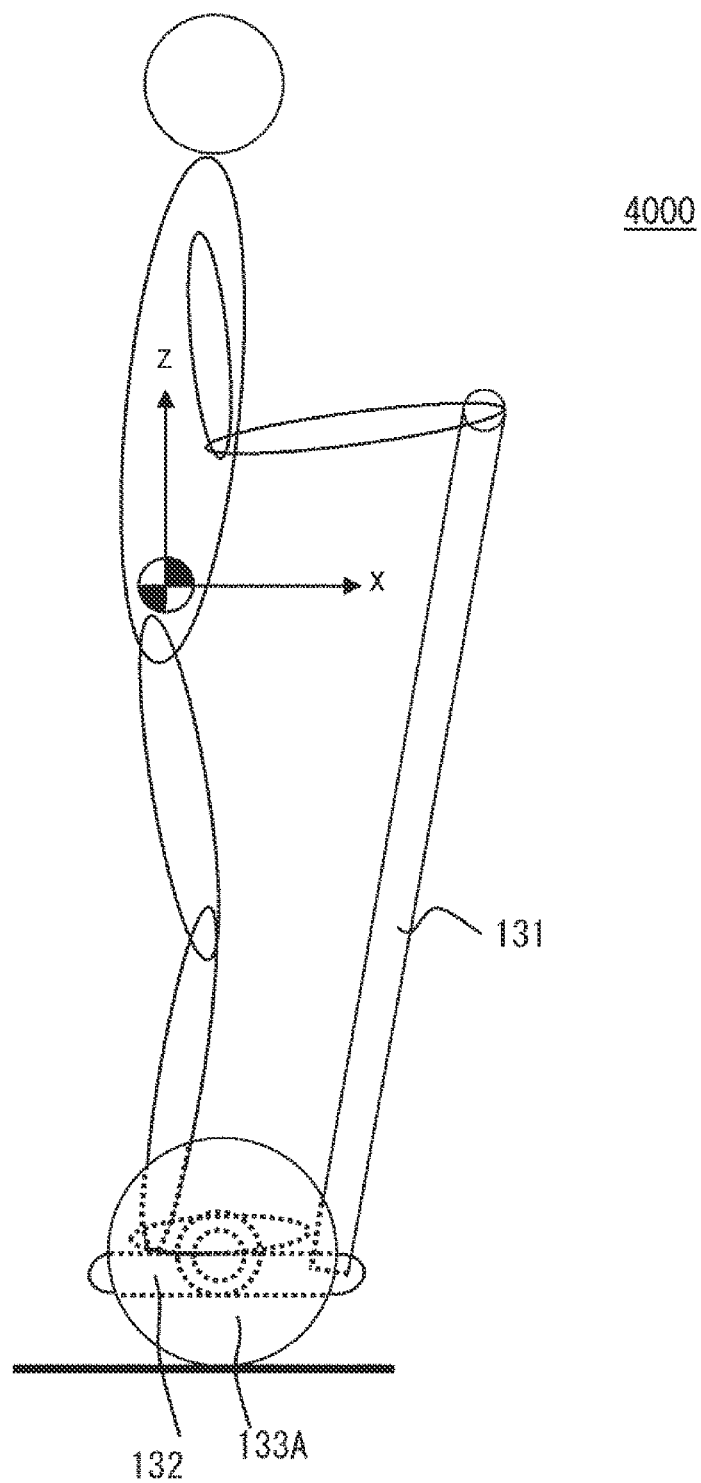
FIG. 9 is a lateral view showing the external configuration of the inverted pendulum according to the fourth embodiment.

The fourth embodiment is another concrete example of the above-mentioned first embodiment. Each of FIGS. 8 and 9 is a view showing the external configuration of an inverted pendulum as a control target of an inverted pendulum control system 4000 according to the fourth embodiment. FIG. 8 is a front view, and FIG. 9 is a lateral view. In each of FIGS. 8 and 9, the inverted pendulum control system 4000 is an example of the above-mentioned plant control system 1000, and is equipped with a handle 131, a vehicle body 132, wheels 133A and 133B, and drive units 43A and 43B. The handle 131 is a T-shaped operating helm that is gripped by a passenger. The wheel 133A and the wheel 133B, which constitute a pair of right and left wheels, are rotatably provided on the vehicle body 132. The inverted pendulum is configured as, for example, a coaxial two-wheel vehicle in which the respective wheels 133A and 133B are arranged parallel along a coaxial core line on the vehicle body 132 as a region where the passenger stands, but is not limited thereto. The present embodiment is applicable to an arbitrary inverted movable body. Besides, the present embodiment is also applicable to a dolly and a pendulum of a four-wheel vehicle.

Figure 10:
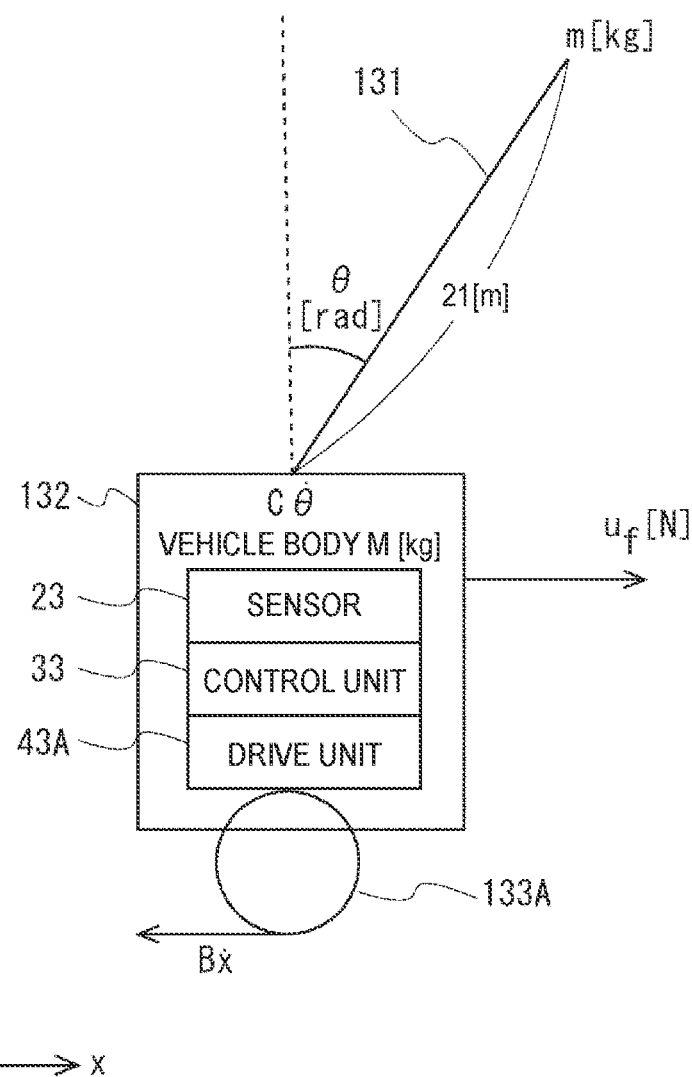
FIG. 10 is a block diagram showing the configuration of an inverted pendulum control system according to the fourth embodiment.

FIG. 10 is a block diagram showing the configuration of the inverted pendulum control system 4000 according to the fourth embodiment. The handle 131 has a length of 2l (m) and a mass of m (kg). An angle $\theta$ is an angle that is formed by the handle 131 with respect to a vertical direction. The vehicle body 132 has a mass of M (kg). A sensor 23, a control unit 33, and the drive units 43A and 43B are included inside the vehicle body 132. The sensor 23 detects the angle $\theta$ of the handle 131 and a moving distance x of the vehicle body 132 in an x-direction, and outputs the detected angle $\theta$ and the detected moving distance x to the control unit 33. The control unit 33 calculates a command value of a force $u_f$ applied to the vehicle body 132 in the x-direction based on the angle $\theta$ from the sensor 23, the moving distance x from the sensor 23, the angular velocity $\omega$ as a time differential of the angle $\theta$, and a speed v as a time differential of the moving distance x, and outputs the calculated command value of the force $u_f$ to the drive units 43A and 43B. Based on the command value, the drive units 43A and 43B drive the wheels 133A and 133B respectively such that the force $u_f$ is applied to the vehicle body 132. Incidentally, the handle 131, (an outer frame of) the vehicle body 132, and the wheels 133A and 133B are examples of the above-mentioned plant 1. The sensor 23 is an example of the above-mentioned sensor 2, the control unit 33 is an example of the above-mentioned arithmetic device 3, and the drive units 43A and 43B are examples of the above-mentioned actuator 4.

It should be noted herein that the control unit 33 according to the present embodiment calculates the force $u_f$ through the use of the following equations. First of all, an equation (41) shown below is used as a concrete example of the equation (11).

$$\frac{d}{dt}\begin{pmatrix} x \\ \theta \\ v \\ \omega \end{pmatrix} = \begin{pmatrix} v \\ \omega \\ \{(J+ml^2)u_f - B(J+ml^2)v + Cml(\cos\theta)\omega + \\ (J+ml^2)ml(\sin\theta)\omega^2 - m^2l^2g\sin\theta\cos\theta\}/\alpha \\ \{-ml(\cos\theta)u_f + Bml(\cos\theta)v - C(m+M)\omega - \\ m^2l^2(\sin\theta\cos\theta)\omega^2 + (m+M)mlg\sin\theta\}/\alpha \end{pmatrix} \tag{41}$$

$$v=\dot{x},\ \omega=\dot{\theta}$$

$$J=\frac{ml^2}{3},\ \alpha=J(m+M)+Mml^2+m^2l^2\sin^2\theta$$

It should be noted herein that B is a viscous friction coefficient (kg/s) between the dolly (the wheels 133A and 133B) and a floor, and that C is a viscous friction coefficient (kgm2/s) between the pendulum (the handle 131) and the dolly.

Besides, when it is assumed in the equation (13) that $K_1=K_2=K_4=[0, 1, 0, 0]$, an equation (42) shown below is established.

$$\dot{\theta}=\omega=-k_1\theta+k_2\int_0^t(\theta_{ref}-\theta)dt \tag{42}$$

That is, each of $K_1$, $K_2$, and $K_4$ is set as a four-component row vector, the second component is made equal to 1, and the remaining components, namely, the first, third, and fourth components are made equal to 0. Thus, an equation where only the angular velocity $\omega$ remains among time differentials of the input vectors can be derived.

Then, when both the sides of the equation (42) are differentiated, $\dot{\theta}$ appears on the right side. When the equation (42) is assigned to this value and arranged, an equation (43) is obtained.

$$\dot{\omega}=k_1^2\theta+k_2(\theta_{ref}-\theta)-k_1k_2\int_0^t(\theta_{ref}-\theta)dt \tag{43}$$

After that, when the equation (43) is assigned to the equation (41) and solved as to the force $u_f$, an equation (44) shown below is established. In consequence, the equation (44) can be regarded as "the equation solved as to the force $u_f$", namely, the control rule.

$$u_f = \left\{-\frac{(M+m)(J+ml^2)}{ml\cos\theta}+ml\cos\theta\right\} \tag{44}$$

$$\left(k_1^2\theta + k_2(\theta_{ref}-\theta)-k_1k_2\int_0^t(\theta_{ref}-\theta)dt\right)-$$

$$ml\sin\theta\left\{-k_1\theta+k_2\int_0^t(\theta_{ref}-\theta)dt\right\}^2 +$$

$$\frac{M+m}{ml\cos\theta}\left(mlg\sin\theta-C\left(-k_1\theta+k_2\int_0^t(\theta_{ref}-\theta)dt\right)\right)+Bv$$

That is, the control rule according to the present embodiment can be expressed by four simple arithmetic operations and simple differentiation and integration as in the equation (44).

Figure 11:
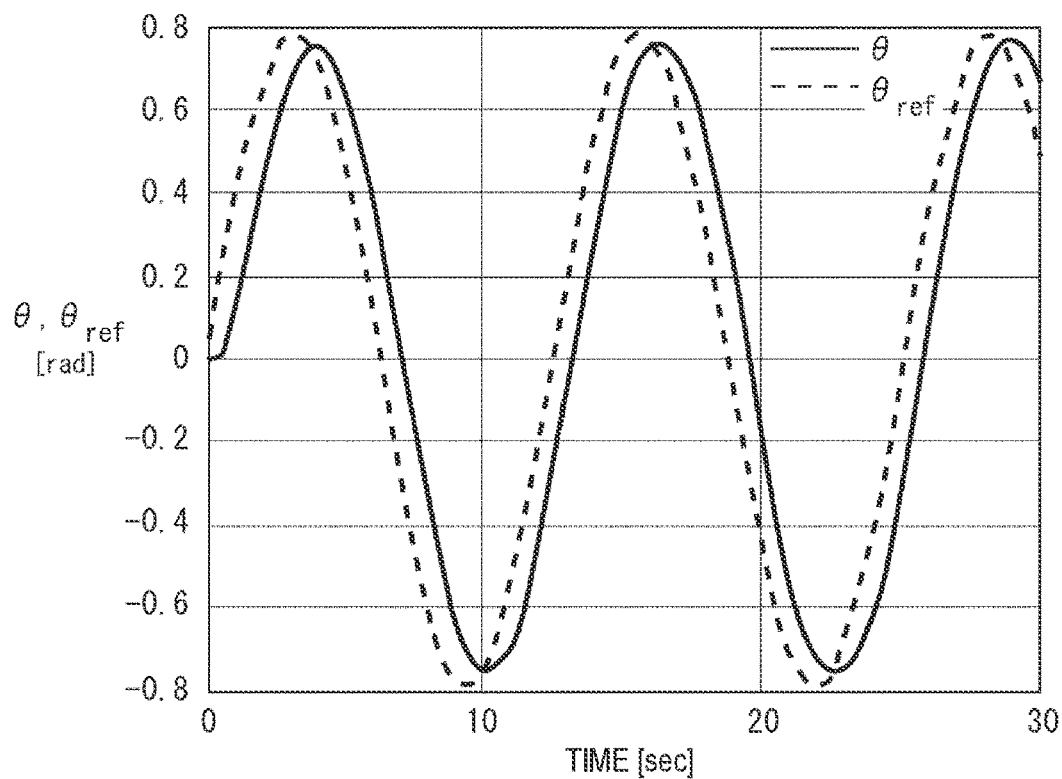
FIG. 11 is a view showing an example of follow-up of the angle of the inverted pendulum according to the fourth embodiment.
Figure 12:
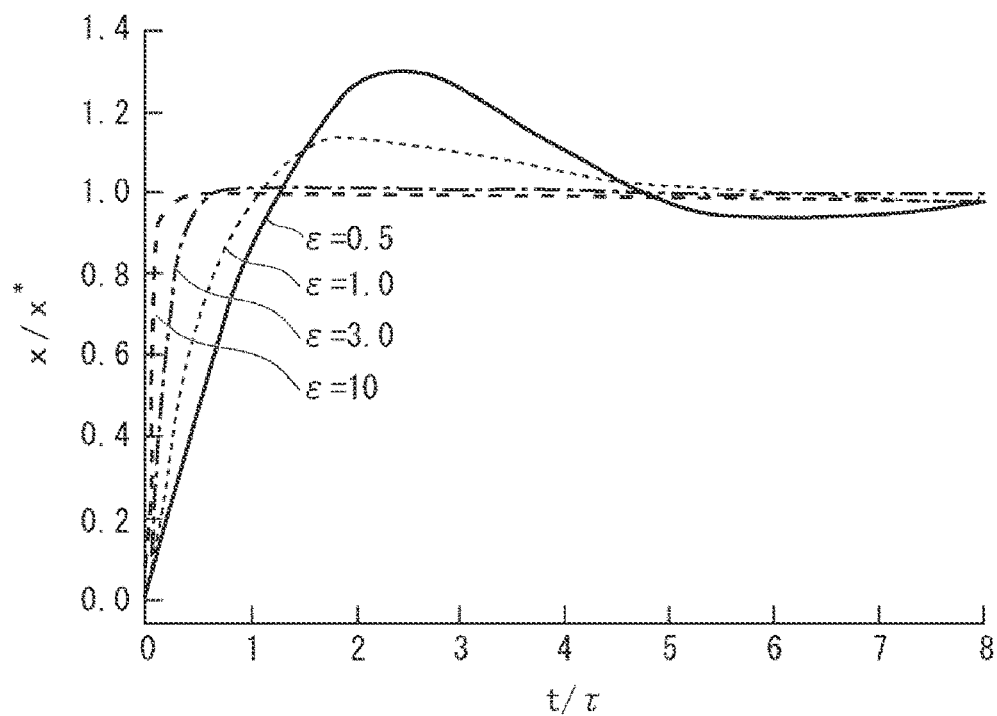
FIG. 12 is a view for illustrating a problem in the related art.

FIG. 11 is a view showing an example of follow-up of the angle of the inverted pendulum according to the fourth embodiment. Thus, in the present embodiment as well, it is demonstrated that the angle θ can follow up a target value $θ_{ref}$ of the angle. In the present embodiment, the inverted pendulum can be expressed by the equation (41) as the plant. Therefore, the rise in responsiveness can be held at an appropriate level, and the degree of freedom in designing response waveforms can be enhanced, while preventing the occurrence of response overshoot, through the use of the equation (44).

Furthermore, in the present embodiment, each of $K_1$, $K_2$, and $K_4$ is a row vector where the remaining components (e.g., the first, third, and fourth components) other than at least one common component (e.g., the second component) are equal to 0. This can make it easy to focus on the control for the response of at least one important index among a plurality of kinds of indices. In this case, the force $u_f$ can be efficiently calculated by focusing on the angular velocity ω among the measured values of the sensor 23.

Other Embodiments

The above-mentioned present disclosure is applicable to a control apparatus that operates actuators based on sensor values of automobiles, devices for manufacturing parts, various facilities, devices for manufacturing materials, home electrical appliances, and the like.

Incidentally, the present disclosure is not limited to the aforementioned embodiments, but can be appropriately changed within such a range as not to depart from the gist thereof. For example, although the disclosure has been described as a hardware configuration in each of the above-mentioned embodiments, the present disclosure should not be limited thereto. In the present disclosure, an arbitrary process can also be realized by causing a central processing unit (a CPU) to execute a computer program.

In each of the above-mentioned examples, the program can be stored through the use of various types of non-transitory computer-readable media and supplied to a computer. The non-transitory computer-readable media encompass various types of tangible storage media. Examples of the non-transitory computer-readable media include a magnetic recording medium (e.g., a flexible disk, a magnetic tape, or a hard disk drive), a magnetooptical recording medium (e.g., a magnetooptical disk), a CD-ROM (a read only memory), a CD-R, a CD-R/W, a digital versatile disc (a DVD), a semiconductor memory (e.g., a mask ROM, a programmable ROM (a PROM), an erasable PROM (an EPROM), a flash ROM, or a random access memory (a RAM)). Besides, the program may be supplied to the computer by various types of transitory computer-readable media. Examples of the transitory computer-readable media include an electric signal, an optical signal, and an electromagnetic wave. Each of the transitory computer-readable media can supply the program to the computer via a wired communication path such as an electric wire, an optical fiber or the like, or a wireless communication path.

What is claimed is:

1. A plant control system comprising:
   a plant;
   an actuator that controls a state of the plant based on a command value; and
   an arithmetic device that calculates the command value through use of state information indicating the state of the plant, and that outputs the calculated command value to the actuator, wherein
   the arithmetic device adopts, as the command value, a value of u obtained by deleting ẏ from the following equations (1) and (2), $$\dot{y}=f(y,u,d,t) \tag{1}$$

where y is the state information, u is the command value, d is a disturbance, t is a time, and ẏ is a time differential of y, and $$K_4\dot{y}=K_3 y_{ref}-K_1 y+K_2\int_0^t(y_{ref}-y)dt+K_5 \tag{2}$$

where $K_1$, $K_2$, $K_3$, $K_4$, and $K_5$ are diagonal matrices, $K_1$, $K_2$, and $K_4$ are not zero matrices, $K_1$ and $K_3$ are different from each other, and $y_{ref}$ is a target value of y.

2. The plant control system according to claim 1, wherein when $k_{1ii}$, $k_{2ii}$, and $k_{3ii}$ are non-zero (i, i) components of $K_1$, $K_2$, and $K_3$ respectively, $k3_{ii} \le α_i$ when $k_{1ii}=α_i+β_i$, $k_{2ii}=α_iβ_i$, $α_i$ and $β_i$ are positive real numbers, and $α_i \ge β_i$.

3. The plant control system according to claim 1, wherein $K_3$ is a zero matrix, and
the equation (2) is the following equation (3), $$K_4\dot{y}=-K_1 y+K_2\int_0^t(y_{ref}-y)dt+K_5 \tag{3}$$

4. The plant control system according to claim 3, wherein each of $K_1$, the $K_2$, and the $K_4$ is a row vector where remaining components other than a common component are equal to 0.

5. The plant control system according to claim 3, wherein
the plant is a fuel cell system that includes a fuel cell stack, a flow rate adjusting valve, and a discharging valve that discharges gas or drains water from the fuel cell stack,
the actuator is a current control device configured to control a state of the fuel cell system by a step-up converter,
the plant control system is further equipped with a hydrogen pressure sensor that measures a hydrogen pressure value of the fuel cell stack and that outputs the hydrogen pressure value to the arithmetic device as the state information,
the equation (1) is the following equation (4), $$\frac{dP}{dt}=\frac{RT}{V}\left(Q_{inj}-\frac{N}{2F}I_u-Q_{hev}-Q_{crs}\right) \tag{4}$$

where P is the hydrogen pressure value, R is a gas constant, T is a temperature of the fuel cell stack, V is a hydrogen volume, $Q_{inj}$ is a flow rate adjusted by the flow rate adjusting valve, N is a number of cells in the fuel cell stack, F is a Faraday constant, $I_u$ is a current limit value of the fuel cell stack as the command value that is output to the current control device, $Q_{hev}$ is a flow rate adjusted by the discharging valve, and $Q_{crs}$ is a crossover flow rate, and
the equation (3) is the following equation (5), $$\frac{dP}{dt}=-\left(\frac{1}{T_1}+\frac{1}{T_2}\right)P+\frac{1}{T_1 T_2}\int_0^t(P_{ref}-P)dt+\dot{P}(0)+\left(\frac{1}{T_1}+\frac{1}{T_2}\right)P(0) \tag{5}$$

where $P_{ref}$ is a target value of P and $T_1$ and $T_2$ are time constants of response of P to $P_{ref}$.

6. The plant control system according to claim 5, wherein each of $T_1$ and $T_2$ is a value satisfying a first condition indicating that an amount of fall in P from $P_{ref}$ corresponding to the time constant is smaller than a first threshold, and a second condition indicating that an amount of change in a minimum current value in the fuel cell stack with respect to the time constant is equal to or smaller than a second threshold, the minimum current value having been limited by $I_u$.

7. The plant control system according to claim 1, further comprising:
a sensor that acquires a state amount of the plant and that outputs the acquired state amount to the arithmetic device as the state information, wherein
the arithmetic device calculates the command value through use of the state information acquired from the sensor.

8. The plant control system according to claim 7, wherein each of $K_1$, the $K_2$, and the $K_4$ is a row vector where remaining components other than a common component are equal to 0.

9. A plant control method comprising:
accepting inputting of state information indicating a state of a plant in an arithmetic device,
calculating, as a command value, a value of u obtained by deleting $\dot{y}$ from the following equations (6) and (7) through use of the state information, in the arithmetic device, $$\dot{y}=f(y,u,d,t) \quad (6)$$

where y is the state information, u is the command value, d is a disturbance, t is a time, and $\dot{y}$ is a time differential of y, and $$K_4\dot{y}=K_3 y_{ref}-K_1 y+K_2\int_0^t(y_{ref}-y)dt+K_5 \quad (7)$$

where $K_1$, $K_2$, $K_3$, $K_4$, and $K_5$ are diagonal matrices, $K_1$, $K_2$, and $K_4$ are not zero matrices, $K_1$ and $K_3$ are different from each other, and $y_{ref}$ is a target value of y, and
outputting the calculated command value to an actuator, in the arithmetic device; and
controlling the state of the plant based on the command value, in the actuator.

10. A non-transitory computer-readable medium that stores a program for causing a computer to perform a process, the process comprising:
processing of accepting inputting of state information indicating a state of a plant;
processing of calculating, as a command value, a value of u obtained by deleting $\dot{y}$ from the following equations (8) and (9), $$\dot{y}=f(y,u,d,t) \quad (8)$$

where y is the state information, u is the command value, d is a disturbance, t is a time, and $\dot{y}$ is a time differential of y, and, $$K_4\dot{y}=K_3 y_{ref}-K_1 y+K_2\int_0^t(y_{ref}-y)dt+K_5 \quad (9)$$

where $K_1$, $K_2$, $K_3$, $K_4$, and $K_5$ are diagonal matrices, $K_1$, $K_2$, and $K_4$ are not zero matrices, $K_1$ and $K_3$ are different from each other, and $y_{ref}$ is a target value of y; and
processing of outputting the calculated command value to an actuator that controls the state of the plant based on the command value.

* * * * *